United States Patent [19]

Yuhara

[11] Patent Number: 5,309,800
[45] Date of Patent: May 10, 1994

[54] NONAXISYMMETRIC SHAPE CUTTING LATHE

[75] Inventor: Hideo Yuhara, Aichi, Japan

[73] Assignee: Okuma Corporation, Japan

[21] Appl. No.: 2,725

[22] Filed: Jan. 11, 1993

[30] Foreign Application Priority Data

Jan. 10, 1992 [JP] Japan .................................. 4-021834

[51] Int. Cl.[5] ............................. B23B 5/36; B23B 7/14
[52] U.S. Cl. ............................................. 82/18; 82/118
[58] Field of Search ................... 82/18, 118, 120, 121, 82/132, 134, 137, 142, 145; 29/27 R, 27 C, 51, 57

[56] References Cited

U.S. PATENT DOCUMENTS

| | | | |
|---|---|---|---|
| 934,863 | 9/1909 | Waern et al. | 82/18 |
| 1,755,349 | 4/1930 | Casse | 82/18 |
| 1,836,853 | 12/1931 | Laffineur et al. | 82/18 |
| 1,931,157 | 10/1933 | Bickel | 82/18 |
| 2,290,341 | 7/1942 | Levitt | 82/18 |
| 2,909,010 | 10/1959 | von Zelewsky | 82/18 |
| 3,066,560 | 12/1962 | Estephanio | 82/18 |
| 3,403,479 | 10/1968 | De Almeida Ferreirinha | 82/18 |
| 3,593,603 | 2/1971 | Gellert | 82/18 |
| 3,916,738 | 11/1975 | Neubrand et al. | 82/18 |
| 4,651,599 | 3/1987 | Ley | 82/18 |

Primary Examiner—William E. Terrell
Attorney, Agent, or Firm—Evenson, McKeown, Edwards & Lenahan

[57] ABSTRACT

A lathe for processing a workpiece into a nonaxisymmetric shape including a cutter to be always contacted with a workpiece surface at an almost fixed angle. A first support shaft is rotatably supported around a first axis mounted on a tool rest, and a second support shaft is rotatably supported around a second axis mounted on and off-centered from the first axis. Also, a third support shaft is rotatably supported around a third axis mounted on and off-centered from the second axis, and a holder for holding the cutter is secured to one end of the third support shaft. A controller controls the rotating angles of the support shafts to control the movement of the cutter forwards and rearwards and also its contact angle.

7 Claims, 9 Drawing Sheets

NONAXISYMMETRIC SHAPE CUTTING LATHE

BACKGROUND OF THE INVENTION

The present invention relates to a lathe for processing a workpiece into a nonaxisymmetric shape such as a cam shape or the like.

A conventional NC (numerically controlled) cam cutting lathe includes a head stock for holding a workpiece and a tool rest for holding a turning tool or bit for cutting the workpiece. Usually, the workpiece has a round bar shape before cutting and one end of this round bar is secured to a spindle mounted on the head stock. On cutting, the spindle is rotated around an axis of the workpiece and the tool rest is slidably moved in the direction of the axis of the workpiece and in the direction perpendicular to the moving direction of the head stock. The knife edge of the bit held on the tool rest is contacted with the side surface of the workpiece so as to cut it. As the tool rest is moved in the moving direction, the contact point of the bit with respect to the workpiece is successively axially move to enable a cutting of the workpiece in a predetermined area in the axis direction of the workpiece. Also, by moving the tool rest towards the workpiece, the contact point of the bit with the workpiece is successively moved in the cutting direction deeper into the interior to carry out deeper cutting.

The above-described lathe structure is the same as a usual lathe. However, in this lathe, the distance from the rotary center to the workpiece surface in the workpiece is not fixed in the radial direction, and thus it is required to move the bit forwards or backwards in the cutting direction in correspondence to the cam shape in synchronism with the rotation of the workpiece. That is, in the lathe for cutting the cam, a driving mechanism or a feeding mechanism for moving the bit forwards or backwards in synchronism with the rotation period of the workpiece is required. In particular, with the increase of the rotation speed of the workpiece for reducing the machining time, the moving of the tool at a quick speed is required.

Accordingly, it is necessary to move the heavy tool rest at high speed, and the tool rest and its sliding saddle surface of a bed are worn. Also, a screw surface of a feeding screw of the feeding mechanism is partially worn at only a frequently used part.

Further, when the tool rest is changed from the rearward movement to the frontward movement and vice versa, the moving direction of the tool rest is suddenly changed and a large shock is given to the feeding mechanism of the tool rest. This large shock often breaks parts of the feeding mechanism or at least deteriorates the accuracy of the same.

In the conventional lathe, in order to avoid the above-described problems, the cutting speed, that is, the workpiece rotation speed, is required to be low.

Also, since the bit is secured to the tool rest, the rotation axis of the workpiece, that is, the angle with respect to the spindle, is fixed. However, regarding the workpiece, the distance (radius) from the rotation axis to the workpiece surface is not equal in the radial direction. Hence, in the cam cutting, the contact angle of the bit with the cam surface is not fixed and is always varied. Particularly, at the large cam radius change part, the bit contact angle is substantially changed. Thus, with the change of the contact angle of the bit, the angle (effective rake angle) of the cutting face of the bit with respect to the cutting surface of the workpiece is changed. This effective rake angle gives a large influence to a cutting force at the cutting time and, with the change of the effective rake angle, the cutting force is changed.

That is, as shown in FIG. 14, when a workpiece 110 is cut into a nonaxisymmetric shape, by only a frontward or rearward movement, that is, an X-direction movement of a tool or cutter 114, a contact angle (rake angle) a of the cutter 114 with respect to the workpiece 110 is always varied depending on the cutting position. When this rake angle a is changed, a shear angle b of a tip 113 is changed. A size of a sliding surface 113a of the tip 113 is changed and thus the cutting force is changed. As described above, changing the effective rake angle to shift out of a design value creates a bad influence on the smoothness of the cutting surface, and the smoothness required to a finish surface can not be satisfied.

Further, in order to avoid a contact of the rear surface of the bit with the cutting surface, as shown in FIG. 13, it is necessary to also increase a clearance angle c of a bit 114. Hence, an included angle e becomes small and a knife strength is drastically reduced.

SUMMARY OF THE INVENTION

It is, therefore, an object of the present invention to provide a lathe in view of the aforementioned problems of the prior art, which is capable of cutting a workpiece, such as a cam, into the desired shape with high accuracy without performing a high speed reversal movement of a large mass tool rest, controlling a cutting force change and improving a knife edge strength.

In order to achieve the foregoing objects, a lathe of the present invention is provided with a tool rest including a plurality of support shafts. As to the support shafts, a first support shaft is rotatably supported on the tool rest, and a second support shaft is rotatably supported on the first support shaft. Then, the following support shafts are constructed so as to be supported in the same manner as described above, and a cutter is secured to the last support shaft. Also, the rotary axes of the support shafts are positioned in mutually eccentric relations, and by controlling the rotation angles, the forward and reverse movement to the workpiece and the angle of the cutter can be changed.

In particular, when there are two support shafts, the lathe includes a first support shaft rotatably supported around a first axis parallel with a workpiece rotation axis on a tool rest, a second support shaft rotatably supported around a second axis off-center from the first axis in parallel with the first axis, a cutter being secured to the second support shaft, first drive means for driving the first support shaft, second drive means for driving the second support shaft, and control means for controlling a position of a knife edge of the cutter by changing rotation positions of the first drive means and the second drive means.

Further, when there are three support shafts, the lathe includes a first support shaft rotatably supported around a first axis parallel with a workpiece rotation axis on a tool rest, a second support shaft rotatably supported around a second axis off-center from the first axis in parallel with the first axis, a third support shaft rotatably supported around a third axis off-center from the second axis in parallel with the second axis, a bit being secured to the third support shaft, first drive means for driving the first support shaft, second drive means for driving the second support shaft, third drive means for driving the third support shaft, and control means for controlling a position of a knife edge of the bit by changing rotation positions of the first drive means, the second drive means and the third drive means.

Also, by controlling the rotation positions of the support shafts on the basis of the work processing shape, the moving position to the workpiece and the angle of the cutter can be controlled. That is, when the workpiece is processed into the nonaxisymmetric shape, in synchronism with the workpiece rotation period, the cutter is moved forwards and backwards to the workpiece to control the cutting amount. Further, in order to obtain the almost fixed cutting angle between the knife edge of the cutter and the workpiece surface, the mounting angle of the cutter is changed.

By controlling the knife edge position and the angle of the cutter as described above, the need to move the whole tool rest at a high speed is removed, and particularly it is unnecessary to perform a reversal operation for changing the moving direction of the tool rest at a high speed. Hence, the cutting speed can be increased, and the partial abrasion of movable members of a feeding mechanism of the tool rest can be prevented. Also, the processing accuracy drop due to plays in the feeding mechanism can also be prevented.

Further, since the contact angle of the cutter with the workpiece is controlled to be a fixed value, a variation of a cutting force can be reduced. Also, since a clearance angle becomes almost fixed, a proper knife edge angle with respect to the workpiece can be given to improve a knife edge strength.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 1:
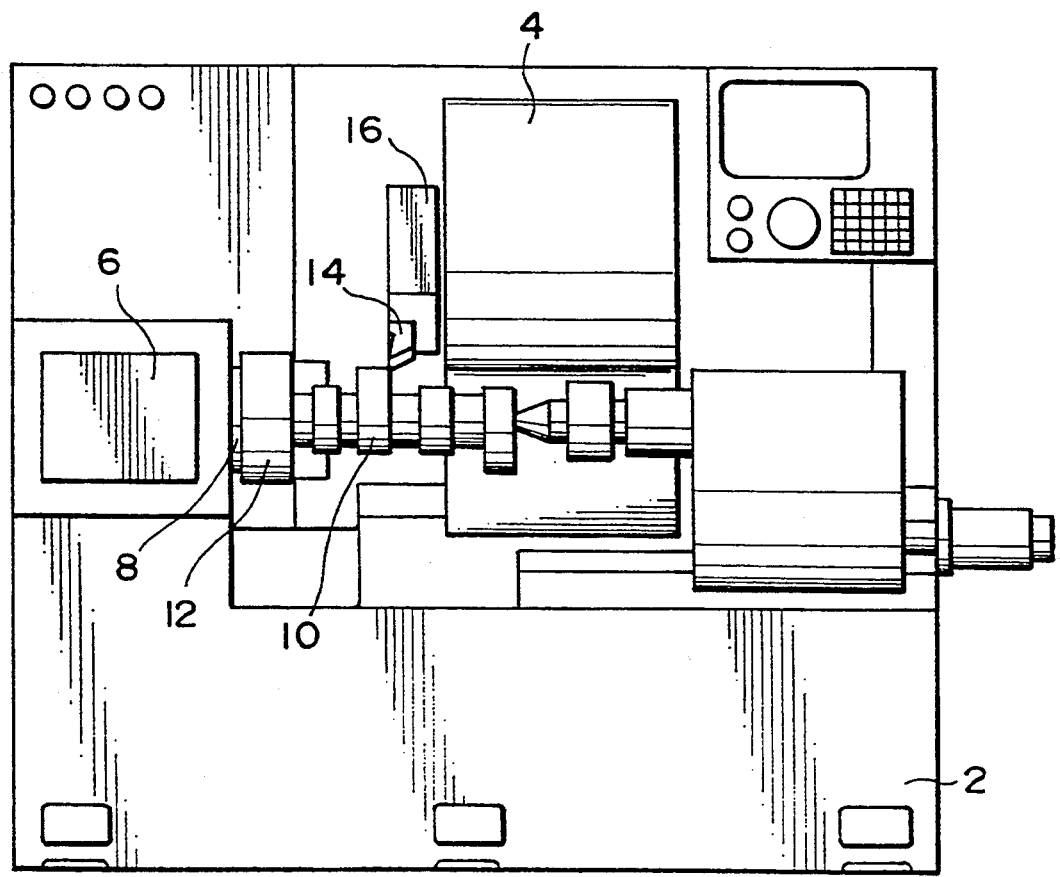
FIG. 1 is an elevational view of a lathe according to the present invention.

Referring now to the drawings, wherein like reference characters designate like or corresponding parts throughout the views and thus the repeated description thereof can be omitted for brevity, there is shown in FIGS. 1 to 5 one embodiment of a lathe for cutting a workpiece into a nonaxisymmetric shape, such as a cam shape, according to the present invention.

As shown in FIG. 1, in the lathe, a tool rest 4 and a head stock 6 are arranged on a bed 2. The head stock 6 includes a main spindle 8 driven by a drive source (not shown), and a chuck 12 for holding a workpiece 10 to be cut is secured to the end of the spindle 8. On the other hand, the tool rest 4 is arranged so as to slidably move in the axis direction of the spindle 8, and a holding device 16 for holding a tool or cutter 14 is secured to the tool rest 4. The tip of the cutter 14 is to be contacted with the surface of the workpiece 10 to be rotated by the spindle 8, and the contact part of the workpiece is cut to obtain the desired shape.

Figure 2:
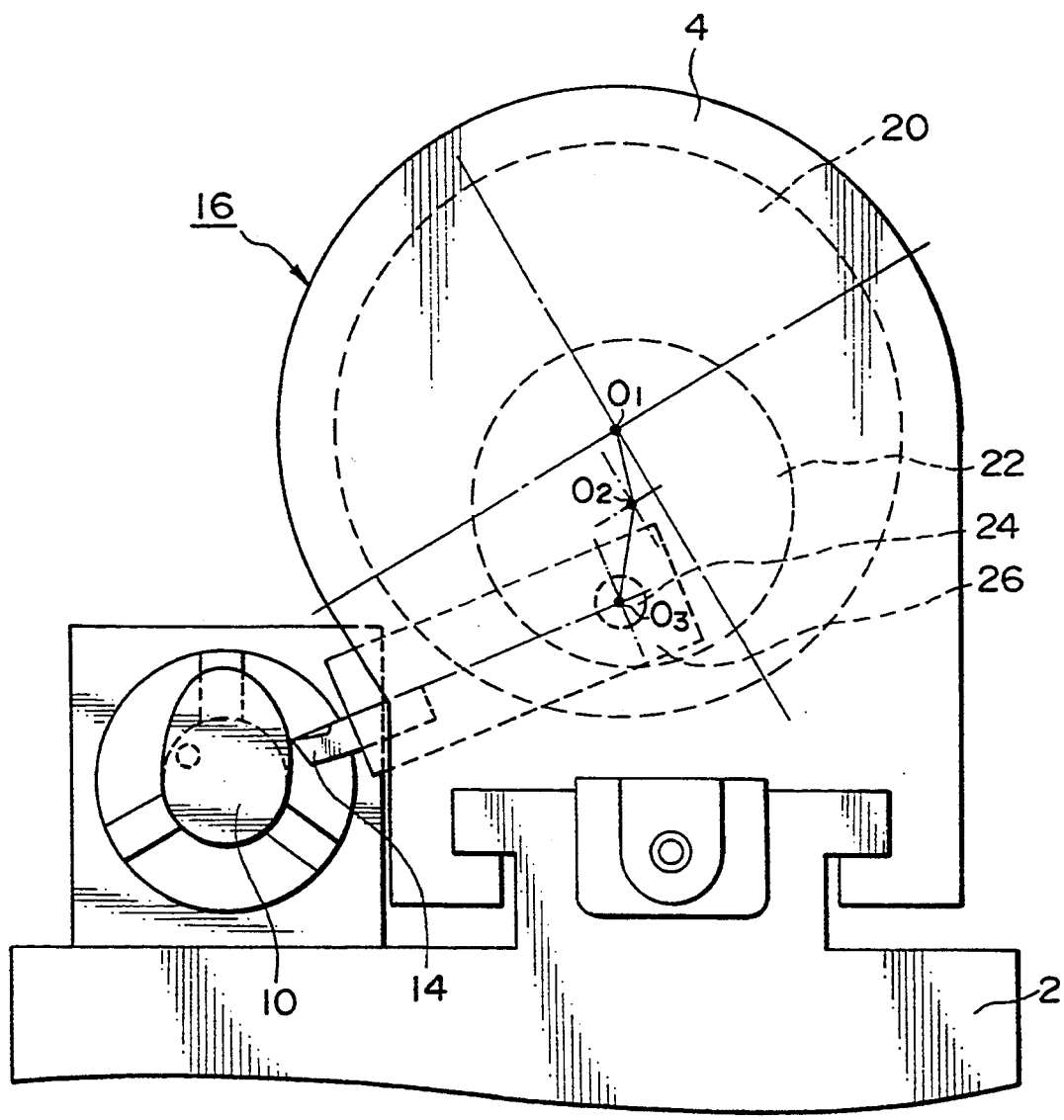
FIG. 2 is a schematic view showing a relationship between a tool rest and a workpiece in the lathe shown in FIG. 1.

FIG. 2 shows a relationship between the holding device 16, the cutter 14 and the workpiece 10. A first support shaft 20 is rotatably supported around a first axis $O_1$ by the tool rest 4, and a second support shaft 22 is rotatably supported around a second axis $O_2$ located on the first support shaft 20. Also, a third support shaft 24 is rotatably supported around a third axis $O_3$ located on the second support shaft 22, and a holder 26 for holding a cutter 14 is supported on the third support shaft 24.

Figure 3:
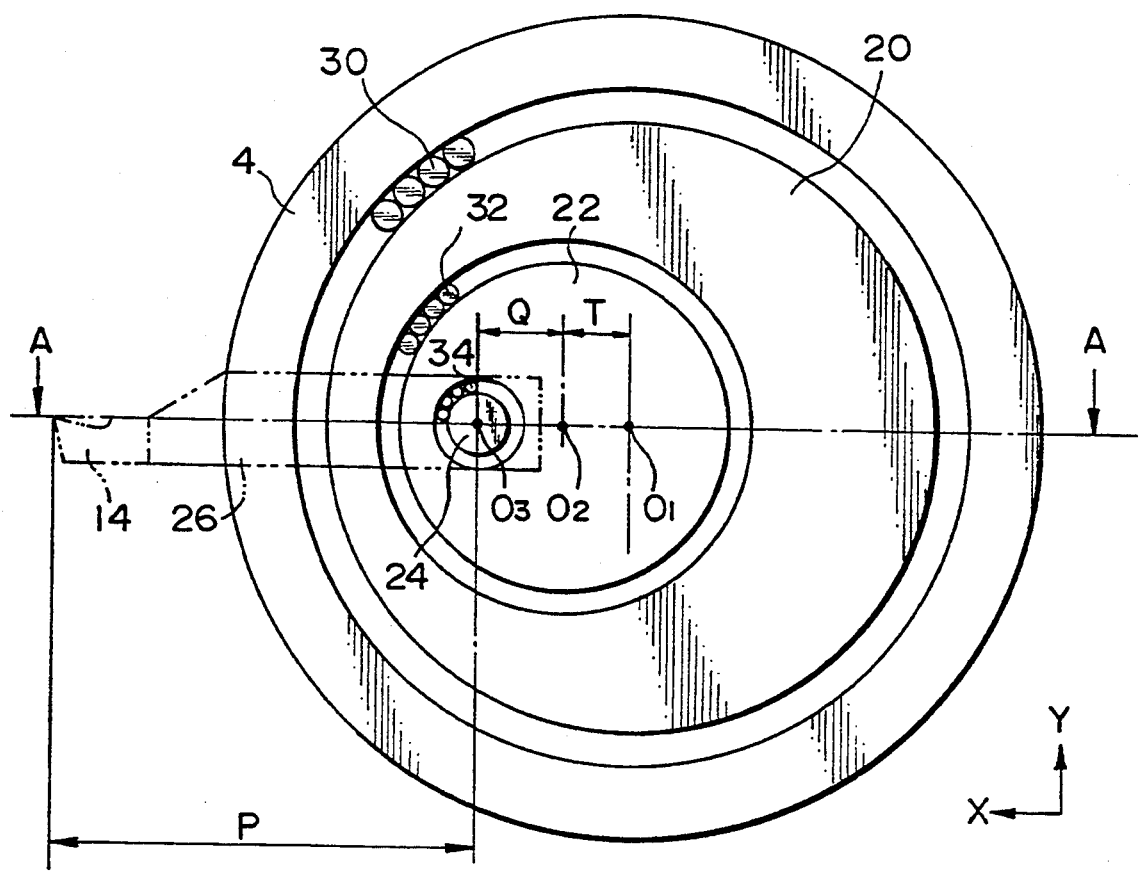
FIG. 3 is a front view of a tool rest shown in FIG. 1.
Figure 4:
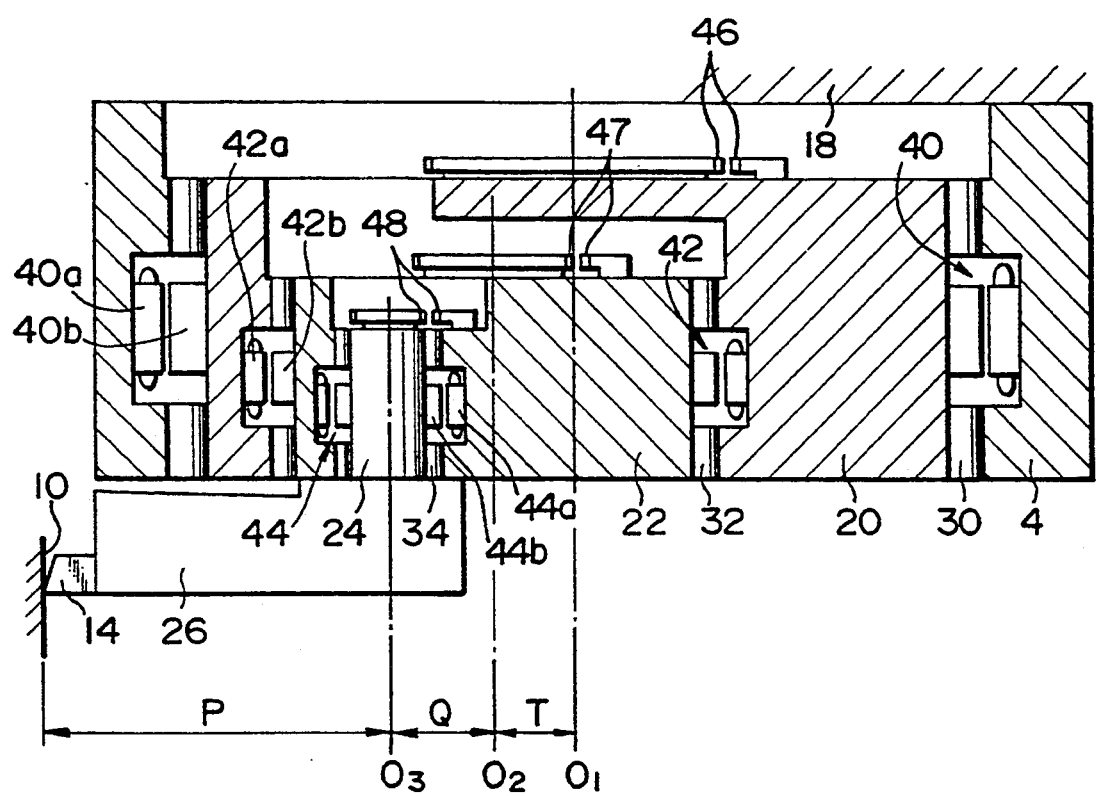
FIG. 4 is a cross sectional view, taken along the line A—A shown in FIG. 3.

FIG. 3 shows the holding device 16, and FIG. 4 is a cross section, taken along the line A—A shown in FIG. 3. The first support shaft 20 is rotatably supported around the first axis $O_1$ on the tool rest 4 via a first bearing 30. Also, the second support shaft 22 is rotatably supported around the second axis $O_2$ off-centered with a distance T from the first axis $O_1$ on the first support shaft 20 via a second bearing 32, and the third support shaft 24 is rotatably supported around the third axis $O_3$ off-centered with a distance Q from the second axis $O_2$ on the second support shaft 22 via a third bearing 34. Onto the third support shaft 24, the cutter or bit 14 is secured via the holder 26 so that a knife edge of the bit 14 may put the cutter 14 at a position separated by a distance P from the third axis $O_3$ of the third support shaft 24.

A first stator 40a is mounted onto the internal periphery of the tool rest 4, and a first rotor 40b is attached to the external periphery of the first support shaft 20. The first stator 40a and the first rotor 40b constitute a first built-in motor 40 as a first drive means for driving the first support shaft 20. A second stator 42a is mounted to the internal periphery of the first support shaft 20, and a second rotor 42b is attached to the external periphery of the second support shaft 22. The second stator 42a and the second rotor 42b constitute a second built-in motor 42 as a second drive means for driving the second support shaft 22. A third stator 44a is mounted to the internal periphery of the second support shaft 22, and a third rotor 44b is attached to the external periphery of the third support shaft 24. The third stator 44a and the third rotor 44b constitute a third built-in motor 44 as a third drive means for driving the third support shaft 24. A first detector 46 for detecting a rotary position of the first support shaft 20, a second detector 47 for detecting a rotary position of the second support shaft 22 and a third detector 48 for detecting a rotary position of the third support shaft 24 are mounted on one ends of the respective first, second and third support shafts 20, 22 and 24.

Figure 5:
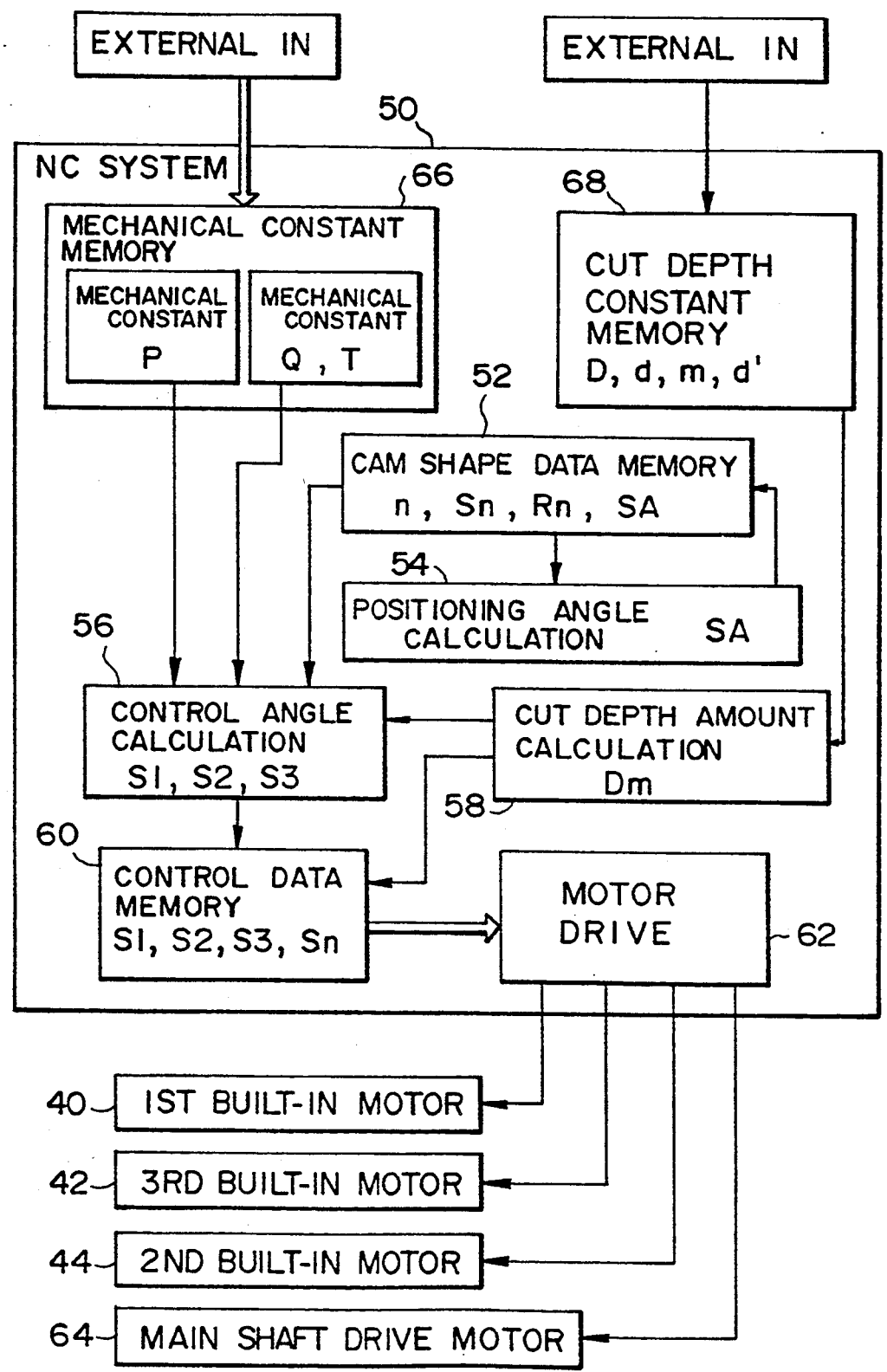
FIG. 5 is a block diagram of a control circuit for a tool rest shown in FIG. 1.

FIG. 5 shows a control circuit of an NC device 50. The NC device 50 includes a cam shape data memory circuit 52 for storing cam shape data n, Sn, Rn and SA input in advance, a positioning angle calculation circuit 54 for calculating a positioning angle SA of the bit 14 with respect to an X-axis, a control angle calculation circuit 56 for calculating control angles S1, S2 and S3 for the first, second and third support shafts 20, 22 and 24 from the cam shape data input from the cam shape data memory circuit 52 and mechanical constants input from a mechanical constant memory circuit 66, a cut depth amount calculation circuit 58 for calculating a rest machining allowance Dm of the bit 24 from cut depth constants input from a cut depth constant memory circuit 68, a control data memory circuit 60 for storing the control data S1, S2, S3, Sn and the like, a motor drive circuit 62 for controlling the first, second and third built-in motors 40, 42 and 44 and a main spindle drive motor 64, the mechanical constant memory circuit 66 for storing mechanical constants P, Q and T input from an external device, and the cut depth constant memory circuit 68 for storing cut depth constants D, d, m and d' input from an external device.

Figure 6:
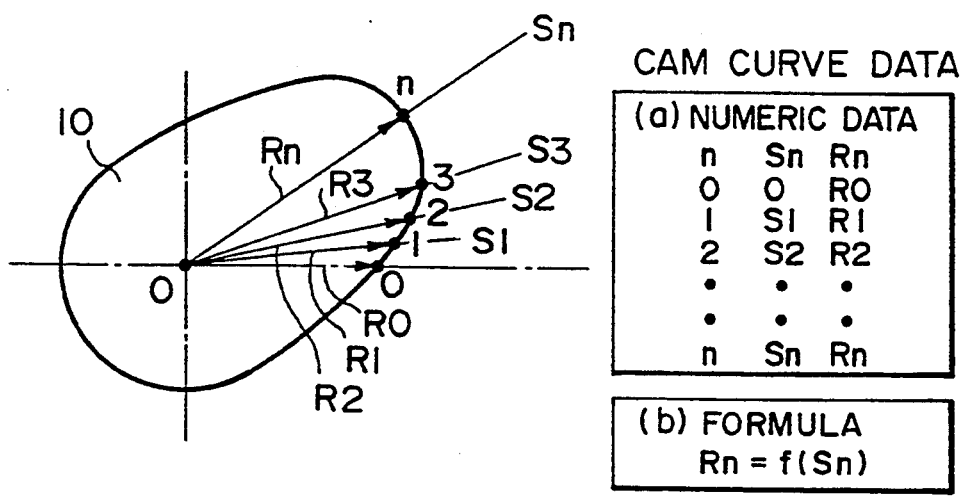
FIG. 6 is an explanatory view showing a cam and cam shape data used in the lathe shown in FIG. 1.
Figure 7:
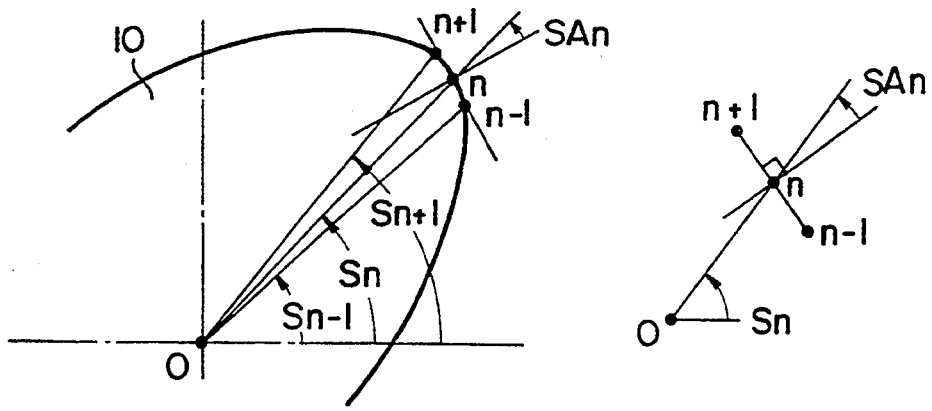
FIG. 7 is an explanatory view showing a calculation method of a positioning angle in the lathe shown in FIG. 1.
Figure 8:
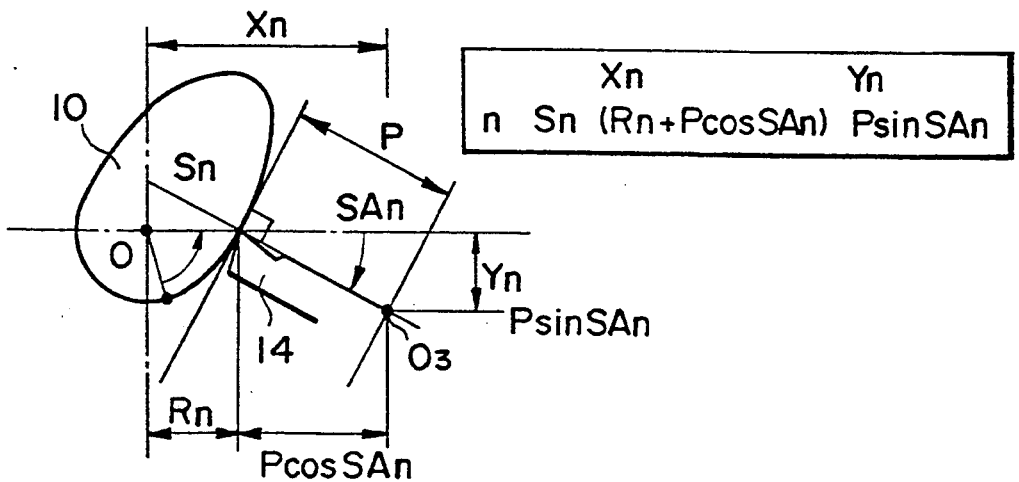
FIG. 8 is an explanatory view showing a positioning of a third support shaft in the lathe shown in FIG. 1.

In the cam shape data memory circuit 52, as shown in FIG. 6, cam curve data are stored in the form of addresses n input in advance on the basis of a cam curve diagram, cam rotary angles Sn of the respective addresses n, and numeric data of formulas including cam displacement amounts Rn. In the positioning angle calculation circuit 54, as shown in FIG. 5, a circle or a straight line passing through 3 points on the cam curve is calculated, and a tangent or an orthogonal at a point n is calculated. Then, angles defined by these obtained results and a straight line connecting the point n and the cam center O are calculated as positioning angles SAn of the bit 14, and the calculation results SAn are stored in the cam shape data memory circuit 52. As shown in FIG. 8, when the workpiece 10 is cut by the bit 14 at the positioning angles SAn, X-axis directional position Xn and Y-axis directional position Yn of the third axis $0_3$ of the third support shaft 24 are calculated as follows.

$$Xn = Rn + P \cos SAn \quad (1)$$

$$Yn = P \sin SAn \quad (2)$$

In order to position the third support shaft 24 in this location, the control angle calculation circuit 56 calculates the control angles S1, S2 and S3 of the first, second and third support shafts 20, 22 and 24 on the basis of the cam shape data, as hereinafter described.

Figure 9:
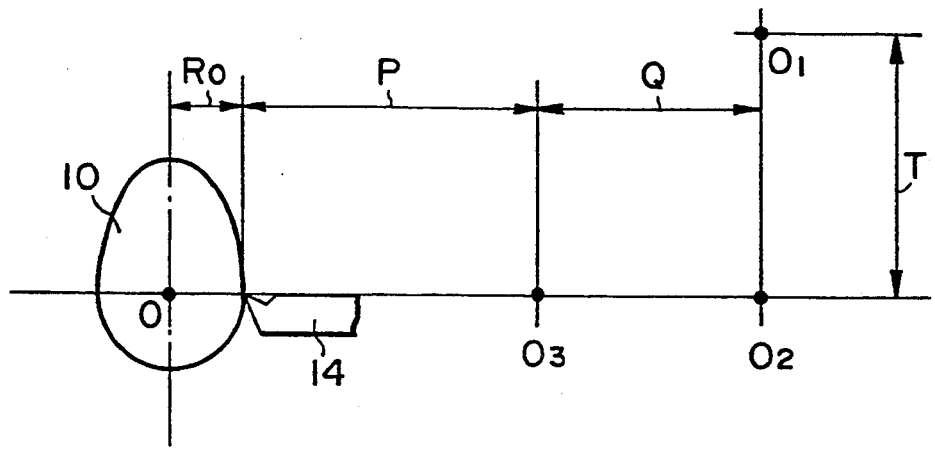
FIG. 9 is an explanatory view showing a positional relationship between axes when an equal radius curve is cut in the lathe shown in FIG. 1.
Figure 10:
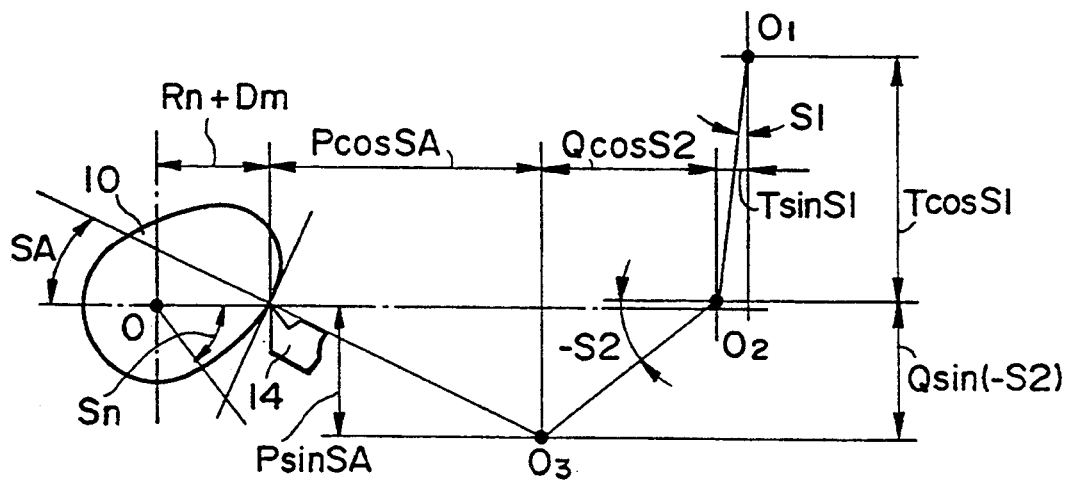
FIG. 10 is an explanatory view showing a positional relationship between axes when a cam shape curve is cut in the lathe shown in FIG. 1.

In the case of cutting the workpiece 10 into a finished dimensional shape shown in FIG. 9, when the bit 14 cuts an equal radius curve of the cam shape, the knife edge of the bit 14 is arranged horizontally at a position spaced apart by a minimum cam displacement amount $R_o$ from the cam center 0 or the main axis (not shown), and on the straight line extending through the cam center 0 and the knife edge of the bit 14, the third axis $0_3$ of the third support shaft 24 and the second axis $0_2$ of the second support shaft 22 are positioned. Also, the first axis $0_1$ of the first support shaft 20 is positioned immediately above the second axis $0_2$. In this state, as shown in FIG. 10, as the workpiece is rotated to the position at the rotary angle Sn by rotating the spindle 8, in connection with this movement, the first, second and third support shafts 20, 22 and 24 are controlled at the respective predetermined angles, and the knife edge of the bit 14 is positioned at the angle SA with respect to the X-axis in the position of the sum of the cam displacement amount Rn and the rest machining allowance Dm. Now, assuming that a rotation in the clockwise direction is defined by +, the control angle $S_1$ of the first support shaft 20 and the control angle $S_2$ of the second support shaft 22 can be calculated by the following simultaneous equations.

$$(Rn - R_o) + Dm - P(1 - \cos SA) - Q(1 - \cos S_2) + T \sin S_1 = 0 \quad (3)$$

$$P \sin SA + Q \sin S_2 + T(1 - \cos S_1) = 0 \quad (4)$$

Further, the control angle $S_3$ of the third support shaft 24 can be obtained by the following formula.

$$S_3 = SA - S_1 - S_2 \quad (5)$$

In the cut depth amount calculation circuit 58, the rest machining allowance Dm is calculated from the input data such as a total machining allowance D, a rough machining allowance d per one time, a finish machining allowance d' and a cut times number m supplied from the cut depth constant memory circuit 67 in the following formula.

$$Dm = D - d \cdot m + d' \quad (6)$$

Figure 11:
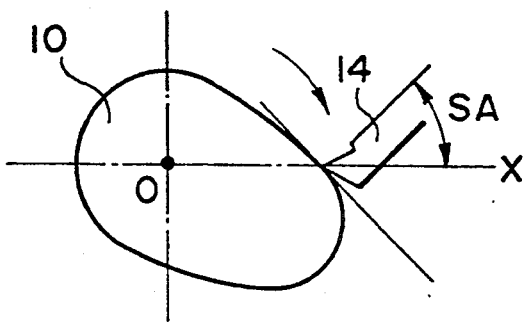
FIG. 11 is an explanatory view showing a cam cutting of the tool rest shown in FIG. 3.

Then, the control data including the rest machining allowance Dm and the control angles $S_1$, $S_2$ and $S_3$ are stored in the control data memory circuit 60. In the motor drive circuit 62, on the basis of the control data read out of the control data memory circuit 60 and the position detection signals detected by the first, second and third detectors 46, 47 and 48, the first, second and third built-in motors 40, 42 and 44 and the main spindle drive motor 64 can be controlled. As a result, as shown in FIG. 11, the bit 14 is positioned at the angle SA with respect to the X-axis and is always directed in the direction perpendicular to the tangent of the cam curve in the same manner as a complete round circle machining operation. Also, the bit 14 is held at a fixed knife edge height while the workpiece is cut by the bit 14. In this case, when the calculation speed of the control angle calculation circuit 56 can not follow the rotation speeds of the first, second and third support shafts 20, 22 and 24, previously calculated data such as data for one spindle rotation of the next rest machining allowance Dm can be stored in the control data memory circuit 60 and be read out thereof when using the same.

The mechanical constants P, Q and T are stored in the mechanical constant memory circuit 66, and for the mechanical constant P of these values, an actual value can be adapted to be input from the outside in order to cope with knife edge abrasion of the bit, a dimensional change when the bit is changed or the like.

Hence, in the above-described lathe for cam cutting, the first, second and third support shafts 20, 22 and 24 are rotatably moved on the basis of the cam shape data, and with these complex movements, the bit 14 is always directed to the direction perpendicular to the tangent of the cam curve and is positioned at the fixed height of its knife edge while the workpiece is cut by the bit 14. Therefore, in this case, there is no need to reversely rotate a large mass tool rest at a high speed, and thus the shock can be relieved to improve the processing accuracy. Further, the first, second and third support shafts 20, 22 and 24 can be rotated at high speed to increase the cutting speed, and the partial abrasion of the sliding members of the tool rest can be also prevented. Also, since the direction of the knife edge of the bit is changed depending on the cam shape, the shear angle of the tip can be controlled to a fixed value to control the variation of the cutting force, and a proper knife edge angle of the bit can be obtained to improve the knife edge strength.

Figure 12:
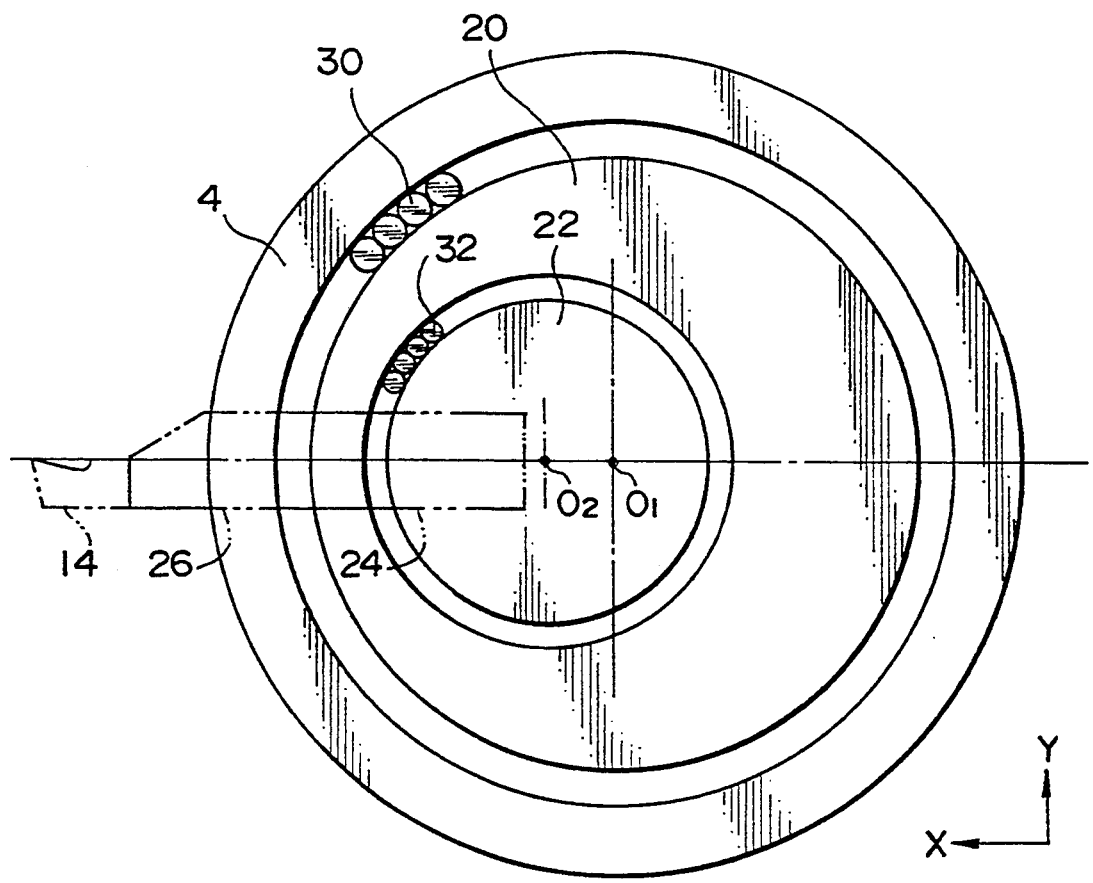
FIG. 12 is a front view of another tool rest used in a lathe according to the present invention.
Figure 13:
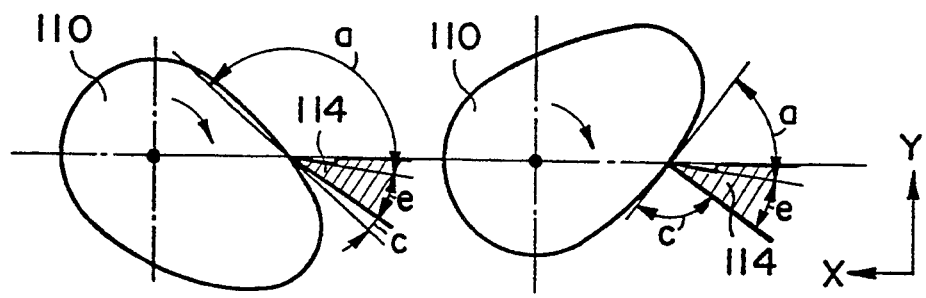
FIG. 13 is an explanatory view showing a relationship between a workpiece and a cutter when a nonaxisymmetric shape is cut in a conventional lathe.
Figure 14:
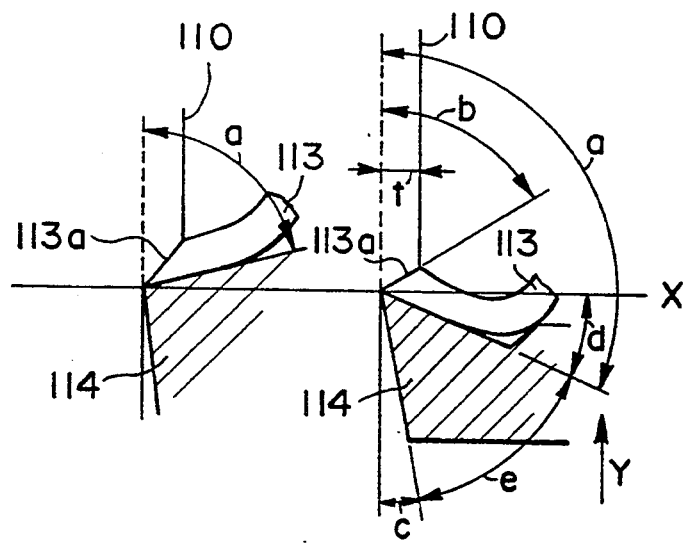
FIG. 14 is an explanatory view showing a tip formation due to a rake angle difference of a cutter in a conventional lathe.

Further, the present invention is not restricted to the above-described embodiment only, and it is possible to change or modify the forms and structures of the parts without departing from the scope and spirit of the present invention. For instance, the first, second and third support shafts 20, 22 and 24 can be driven by motors directly connected thereto. Also, when a bit angle is not substantially changed, for example, in case of a small lift amount and a smooth cam shape, it is unnecessary to control the SA angle and it is sufficient to control only the high response property. Hence, one axis of the three axes is fixed, and the other two axes are used. Also, there is no need to provide three axes and the axes number can be reduced depending on necessity, for example, it is sufficient to provide only two support shafts, as shown in FIG. 12, wherein a third support shaft is omitted.

As described above, according to the present invention, with a complex movement of first, second and third support shafts on the basis of a cam shape, a bit cuts a workpiece while the bit is always directed to a direction perpendicular to a tangent of a cutting surface of the workpiece and is positioned at a fixed knife edge height. Hence, there is no need to reversely rotate a large mass tool rest at a high speed and a change of a cutting force can be properly controlled to improve a knife edge strength and to process the workpiece into a predetermined cam shape with high accuracy.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A lathe for processing a workpiece into a nonaxisymmetric shape, comprising:
    means for rotating the workpiece about an axis;
    a tool rest comprising a first support shaft rotatably supported around a first axis parallel with the workpiece rotation axis;
    a second support shaft rotatably supported on the first support shaft around a second axis off-centered from and in parallel with the first axis, with a cutter bit having a knife edge and being secured to the second support shaft;
    first drive means for driving the first support shaft;
    second drive means for driving the second support shaft; and
    means for electronically controlling a position of the knife edge by changing rotation positions of the first drive means and the second drive means.

2. The lathe of claim 1, wherein the control means includes a controller for moving the tool rest forwards and rearwards relative to the workpiece on the basis of a workpiece shape.

3. The lathe of claim 1, wherein the control means includes a controller for moving the tool rest forwards and rearwards relative to the workpiece on the basis of a workpiece shape and controlling the cutter bit so that the cutter bit and a workpiece surface are always contacted with each other at an almost fixed angle.

4. A lathe for processing a workpiece into a nonaxisymmetric shape, comprising:
    means for rotating a workpiece about an axis;
    a tool rest comprising a first support shaft rotatably supported around a first axis parallel with the workpiece rotation axis;
    a second support shaft rotatably supported on the first support shaft around a second axis off-centered from and in parallel with the first axis;
    a third support shaft rotatably supported on the second support shaft around a third axis off-centered from and in parallel with the second axis, with a cutter bit having a knife edge being secured to the third support shaft;
    first drive means for driving the first support shaft;
    second drive means for driving the second support shaft;
    third drive means for driving the third support shaft; and
    means for electronically controlling a position of a knife edge of the bit by changing rotation positions of the first drive means, the second drive means and the third drive means.

5. The lathe of claim 4, wherein the control means includes a controller for moving the tool rest forwards and rearwards relative to the workpiece on the basis of a workpiece shape.

6. The lathe of claim 4, wherein the control means includes a controller for moving the tool rest forwards and rearwards relative to the workpiece on the basis of a workpiece shape and controlling the cutter bit so that the cutter bit and a workpiece surface are always contacted with each other at an almost fixed angle.

7. A method for machining a workpiece into a desired nonaxisymmetric shape, comprising the steps of
    rotating the workpiece about a main spindle axis,
    selectively moving a tool rest in a direction parallel to the main spindle axis, and
    controlling, on the basis of the desired workpiece nonaxisymmetric shape, a rotational position of a first shaft supported on the tool rest about a first axis spaced from and parallel to the main spindle axis and a rotational position of at least one additional shaft comprising a second shaft supported on the first haft about a second axis spaced from and parallel to the first axis, said second shaft supporting a cutter bit with a knife edge, so as to move the knife edge selectively in a direction toward and away from the workpiece via rotation of the first shaft, second shaft and cutter bit about their respective axes, to machine the workpiece into the nonaxisymmetric shape, whereby high speed movement and reversal of movement of the tool rest is avoided and an increased cutting speed is obtained.

* * * * *